PRECISION VARIABLE FREQUENCY DIVIDERS

Filed April 2, 1956

INVENTOR.
LELAND T. THOMASSON

BY
Reynolds, Beach & Christensen

ATTORNEYS

United States Patent Office 2,903,649

Patented Sept. 8, 1959

2,903,649

PRECISION VARIABLE FREQUENCY DIVIDERS

Leland T. Thomasson, Seattle, Wash., assignor to Boeing Airplane Company, Seattle, Wash., a corporation of Delaware Application April 2, 1956, Serial No. 575,552

11 Claims. (Cl. 331—54)

This invention relates to improvements in electronic frequency dividers and more particularly in those of the type incorporating a monostable trigger circuit such as a monostable multivibrator subjected to recurrent triggering signals of a frequency to be divided and capable of responding synchronously to selected cycles thereof constituting a frequency submultiple of said recurrent triggering signals. The operation of such frequency division circuits depends upon the capacity of the monostable trigger circuit to reject applied triggering signals during its quasi-stable period and to respond to the first such signal applied thereto immediately following substantial completion of recovery from its quasi-stable condition in order to reenter such condition. The invention is herein illustratively described by reference to the presently preferred form thereof as applied to the precision frequency division of the output of a highly constant signal frequency source such as a crystal-controlled oscillator; however, it will be recognized that certain changes and modifications therein may be made without departing from the essential or characterizing features involved.

With conventional frequency division circuits of the type mentioned above, it is difficult to achieve stability of operation at frequency division ratios of more than ten or twenty to one, with a single multivibrator or other monostable trigger circuit as the synchronized component of the frequency division circuit. Higher division ratios were achievable in such cases only by cascading of monostable trigger circuits having progressively longer quasi-stable periods constituting successive multiples. In order to obtain stable operation at very high frequency division ratios a relatively large number of monostable trigger circuits in cascade arrangement was necessary, involving numerous components and the usual problems attending complex and critically sensitive electronic apparatus.

A principal object of the present invention is practical and reliable frequency division circuit means capable of stable operation at frequency division ratios which are many times those achievable with conventional frequency division circuits having the same number of monostable trigger circuits incorporated therein. The invention therefore provides for relatively simple frequency division circuit means having comparatively few components and capable of achieving the operational stability and accuracy of former circuits encumbered with many more components.

A related object is to achieve these purposes in a frequency division circuit which is adjustable in its frequency division ratio throughout a relatively wide range.

Another object of the invention is a novel electronic circuit arrangement for accurately synchronizing the recurrent operation of a monostable multivibrator or other trigger circuit at relatively low frequency with a definite submultiple frequency of the triggering signals produced by a relatively high frequency source such as a crystal-controlled oscillator, whereby recurrent initiation of the quasi-stable condition of the trigger circuit is caused to occur consistently at a given phase point in each of the submultiple-frequency cycles of the triggering signals. The invention further permits adjusting the divisional frequency of recurrent operation of the trigger circuit while retaining the aforesaid accuracy of synchronization thereof with the reference source.

In conventional electronic frequency division circuits of the described type the high frequency triggering signals are applied directly to the monostable trigger circuit. During the quasi-stable condition of the trigger circuit the applied triggering signals have no effect; however, as the trigger circuit begins to recover from the quasi-stable condition the exponential decay of potential on the control element to which the triggering signals are applied ultimately renders the circuit responsive to one of the triggering signals so as to retrigger the circuit into its quasi-stable condition. The difficulty with this conventional arrangement which causes its instability at high frequency division ratios is the fact that the recovery of circuit sensitivity occurs at an exponential rate, and the circuit is retriggered somewhat before it substantially completes its full recovery from the quasi-stable condition, namely in the nearly flat portion of the recovery curve. As a result, any slight variations in amplitude of the applied triggering signals and any slight variations in length of the quasi-stable period, caused by supply voltage fluctuations, variations in the characteristics of the vacuum tubes or other elements used in the trigger circuit, etc., can produce relatively large frequency division errors.

The present invention, recognizing the specific nature of the cause of instabilities in such circuits provides a novel frequency division circuit which includes controlled gate means or the like interposed between the triggering signal source and the monostable trigger circuit, which gate means is operated synchronously with the trigger circuit and effectively isolates the same from the triggering signals until the trigger circuit substantially fully recovers from its quasi-stable condition on each operating cycle thereof. In the preferred embodiment of the invention the quasi-stable trigger circuit comprises a multivibrator, and the novel gating arrangement comprises an amplifier. The incoming triggering signals are applied to one control element of the amplifier and the amplifier output is connected to the monostable trigger circuit for triggering the same into its quasi-stable condition. An energy storage circuit connected to a second control element in the amplifier is charged during the quasi-stable condition of the monostable trigger circuit to bias off the amplifier. Initiation of recovery of the trigger circuit from its quasi-stable condition initiates decay of amplifier cut-off bias in such energy storage circuit at a rate which is materially slower than the rate of recovery of the trigger circuit, and which progresses substantially linearly to the point of rendering the amplifier again operative. Consequently, a substantially constant period of time is allowed for completion of recovery of the monostable trigger circuit following each initiation of recovery thereof from its quasi-stable condition, before the amplifier permits triggering signals to reach such trigger circuit, and the former cause of operational instability is thereby eliminated.

The use of the gating amplifier or equivalent means performing the trigger circuit inhibiting function during the recovery period has the further advantage of providing a strong and sharply defined trigger pulse to the monostable trigger circuit, which pulse is not affected by adjustment of the means controlling the duration of the quasi-stable period of such trigger circuit which determines the frequency division ratio of the system.

These and other features, objects and advantages of the invention will become more fully evident from the following detailed description thereof by reference to the preferred embodiment as illustrated in the accompanying drawings.

Figure 1:
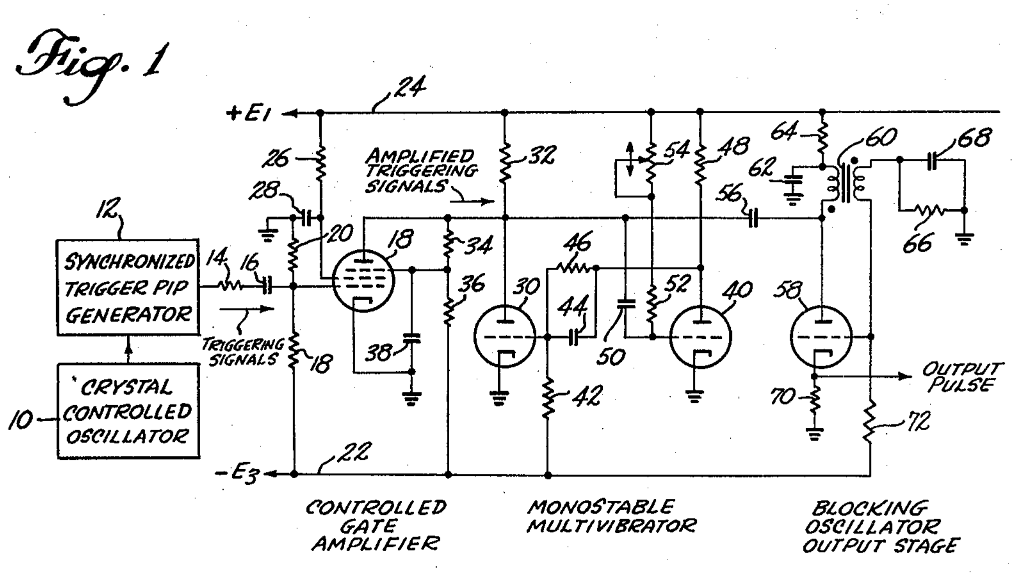
Figure 1 is a schematic diagram of the frequency division circuit arrangement.

Referring to the drawings, the illustrated source of triggering signals comprises the crystal-controlled oscillator 10 delivering a sine wave of constant relatively high frequency to the synchronized trigger pip generator 12 from which the recurrent high-frequency triggering signals emanate. It will, of course, be recognized that the invention is not concerned with or confined to any particular circuit apparatus for generating the triggering signals the frequency of which is to be divided. The synchronized trigger pip generator 12 may, for example, comprise a triggered blocking oscillator capable of generating short discrete trigger pulses synchronized cycle for cycle with the sine wave output of the crystal-controlled oscillator 10. The output from the pip generator 12 is delivered through a damping resistor 14 and coupling condenser 16 to the control grid of amplifier pentode tube 18 forming part of the controlled gate amplifier circuit.

The control grid of tube 18 is subjected to a negative bias potential of a value such that only the sharply defined peaks of the positive-going triggering signals reach such control grid as a means of more precisely phase-relating the amplified triggering signals at the anode of amplifier 18 to the original sine waves generated by the crystal-controlled oscillator 10. Such control grid negative bias is provided by connecting it to the junction between voltage divider resistors 18 and 20, the opposite end of resistor 18 being connected to the conductor 22 carrying negative potential minus $E_3$, and the opposite end of resistor 20 being grounded. The amplifier screen grid is connected to a conductor 24 carrying positive supply potential plus $E_1$ through the screen loading resistor 26 by-passed to ground by the condenser 28. The amplifier cathode is directly grounded, as shown.

Amplifier tube 18 and the first tube 30 in the monostable multivibrator draw anode current through a common load resistor 32. The suppressor grid of amplifier 18 is connected in a voltage divider circuit including the resistor 32 connected in successive series arrangement with the respective resistors 34 and 36. The junction between the latter two resistances is connected to the suppressor grid of tube 18, whereas the opposite end of resistance 36 is connected to the negative potential conductor 22. A storage condenser 38 is connected between ground and the suppressor grid. The relative values of the resistances 32, 34 and 36 are such that with the multivibrator tube 30 substantially nonconductive the voltage divider potential applied to the suppressor grid of tube 18 renders such tube operative as an amplifier of triggering signals. In fact, as will be explained subsequently in connection with the wave diagram in Figure 2, such voltage divider potential applied to the suppressor grid is materially higher than the potential (substantially ground potential) required to accomplish that result.

The illustrated monostable trigger circuit comprises the multivibrator having the two triode amplifiers 30 and 40 connected in a circuit arrangement whereby in the quiescent condition of the multivibrator, tube 30 is nonconductive and tube 40 is conductive. The cathodes of both amplifiers are grounded. The control grid of amplifier 30 is connected through grid-leak resistance 42 to negative conductor 22 and through coupling condenser 44, by-passed by resistance 46, to the anode of tube 40. The latter has a load resistor 48 connected to positive conductor 24. The control grid of triode 40 is connected through coupling condenser 50 to the anode of triode 30 and is connected through fixed resistance 52 in series with variable resistance 54 to the positive potential conductor 24.

It will be recognized that the combined resistances of resistors 52 and 54 together with the value of coupling condenser 50 establish the duration of the quasi-stable period of the multivibrator and that by adjusting the value of resistance 54 it is possible to vary such quasi-stable period, thereby to vary the frequency division ratio of the system. The quasi-stable condition of the monostable multivibrator is initiated by the negative-going amplified triggering signals coupled from the anode of amplifier 18 to the control grid of triode 40 through the coupling condenser 50. At the inception of such a triggering signal tube 40 is rendered less highly conductive, which in turn applies an increasing potential to the control grid of tube 30 in trigger circuit fashion. The action is cumulative until tube 40 is rendered completely nonconductive and tube 30 is rendered conductive to the point of saturation, leaving residual charges on condensers 44 and 50. As the negative charge on condenser 50 leaks off through resistances 52 and 54, a potential is ultimately reached, at the control grid of tube 40, at which the latter becomes slightly conductive, and this initiates recovery of the circuit from its quasi-stable condition. Recovery is not instantaneous, however, because it takes time to restore the original charges on condensers 44 and 50, as the anode of triode 30 rapidly rises in potential with initiation of such recovery action. However, with this rapid rise of anode potential the period of discharge of energy from condenser 38 is initiated accompanied by progressive decay of cut-off potential on the suppressor grid of tube 18. Not until multivibrator recovery is substantially fully completed does the decaying negative potential on the suppressor grid of tube 18 reach the point of cut-off at which amplifier 18 is again rendered operative.

With each initiation of the quasi-stable condition of the multivibrator a negative impulse is transmitted from the output thereof, namely from the anode of tube 30, through coupling condenser 56 to the anode of tube 58 connected in a blocking oscillator circuit. This negative impulse passes through the primary winding of the blocking oscillator transformer 60, the opposite end of such primary being grounded through the by-pass condenser 62. The blocking oscillator is of conventional form, including the plate load resistance 64 connected directly to the positive potential point $E_1$ and through the transformer primary to the anode of the amplifier triode 58. The transformer secondary is connected at one end to the control grid of amplifier 58 and its opposite end is connected to ground through the resistance 66 and by-pass condenser 68. The control grid is connected to negative bias conductor 22 through the grid leak resistance 72. The output pulses from the blocking oscillator are derived from the cathode thereof which is returned to ground through a cathode loading resistance 70 as shown. Thus, with each initiation of the quasi-stable condition of the multivibrator a positive impulse is developed at the cathode of tube 58 and this constitutes the final output pulse from the frequency division circuit.

The operation of the frequency division circuit will now be described in connection with the wave diagrams shown in Figure 2. The latter consists of five different time diagrams of recurrent voltages occurring in the circuit depicted in conventional graphical fashion. Graph *a* represents the high frequency recurrent triggering signals applied to the control grid of tube 18. Graph *b* is the voltage waveform appearing at the anode of tube 30. Graph *c* is the voltage waveform appearing at the suppressor grid of tube 18. Graph *d* is the voltage waveform appearing at the control grid of tube 40. Graph *e* is the output voltage waveform appearing at the cathode of tube 58.

Figure 2:
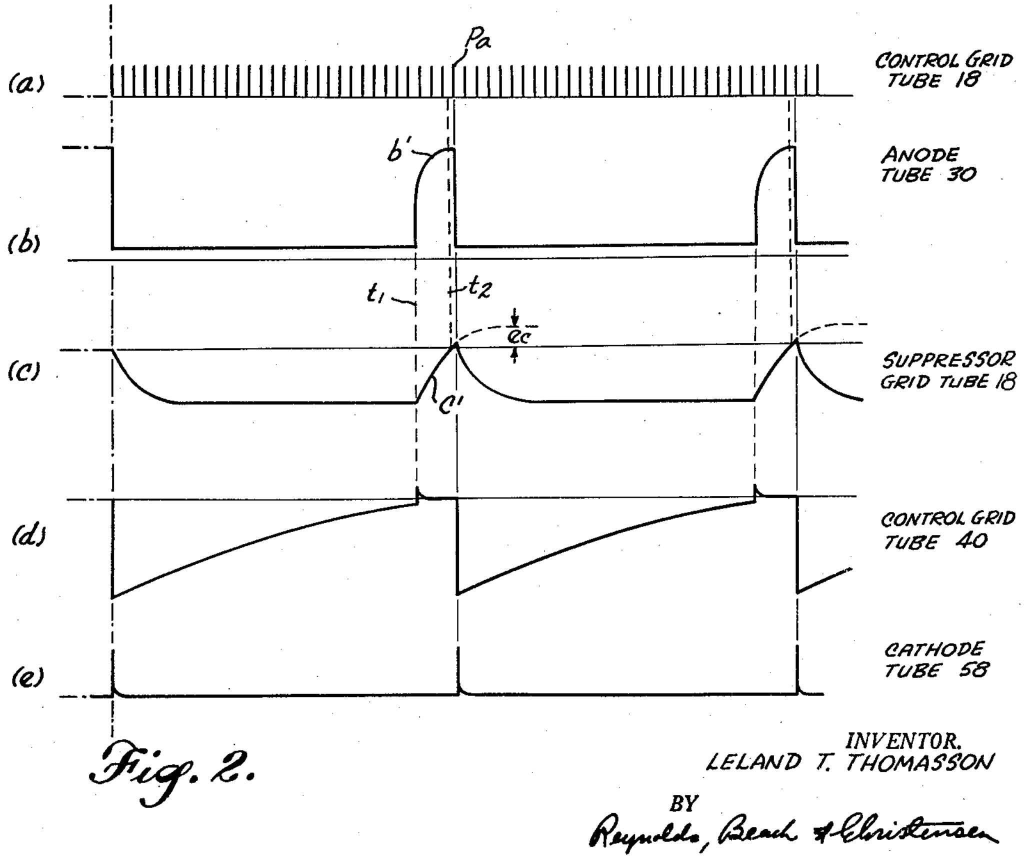
Figure 2 is a wave diagram graphically illustrating the principle of operation of the circuit.

At the beginning of the events depicted in Figure 2 one of the triggering signals shown in graph *a* applied to the control grid of gate amplifier tube 18 and amplified and inverted thereby, reaches the control grid of tube 40, reducing the conduction in such tube and initiating the quasi-stable condition in the monostable multivibrator circuit. The anode potential of tube 30 immediately drops to a relatively low value as shown in graph *b*, and the potential at the control grid of tube 40 likewise drops to a relatively low value well below cut-off value of the tube. The drop in potential at the anode of tube 30 produces a charge of energy on condenser 38 of negative potential with respect to the suppressor grid of tube 18, which charge ultimately reaches and thereafter remains at a constant value during the quasi-stable condition of the multivibrator. As previously explained, a positive-going output pulse appears at the cathode of blocking oscillator tube 58, as shown in graph *e*, at the initiation of the quasi-stable condition in the multivibrator.

As the negative charge on coupling condenser 50 leaks off through resistances 52 and 54 in the exponential fashion shown in graph *d* a point is reached, at time $t_1$, at which the monostable multivibrator commences its abrupt recovery from the quasi-stable condition. The recovery waveform *b'*, representing primarily the discharge of coupling condenser 50 follows an exponential curve and is virtually completed by the time $t_2$, by which time the slope of the recovery wave *b'* is practically zero. In order to permit the monostable multivibrator to complete its full recovery before it can be retriggered by a succeeding triggering signal, the gate amplifier 18 remains biased beyond cut-off throughout the entire period from $t_1$ to $t_2$. At the instant of time $t_2$, or later, the negative bias potential applied to the suppressor grid of gate amplifier 18 has just reached zero in relation to the cathode, or a value at which the amplifier again becomes operative to amplify the triggering signals applied to its control grid. It is important, however, that the timing of the arrival of the negative bias at the suppressor grid of tube 18 be definitely related to the point of time $t_1$ at which the multivibrator recovery commences. This is necessary to achieving stability in the frequency division operation of the circuit.

In order to cause the amplifier 18 to be rendered operative at a definite and fixed time interval after initiation of recovery of the monostable multivibrator, extending beyond the time of substantially full recovery of such multivibrator, the time constant of the discharge circuit for the storage condenser 38, and the ultimate potential $e_c$ to which the condenser exponential discharge curve *c'* would ultimately go if the discharge were permitted to complete itself, are so selected that the initial linear portion of curve *c'* intersects the line representing the cut-off bias potential of the suppressor grid of tube 18.

Thus it will be seen that the chief cause of instability in the operation of conventional frequency division circuits, namely the absence of complete recovery of the monostable trigger circuit or multivibrator, is removed by the action of the gate amplifier in desensitizing the trigger circuit during such recovery period. In order to insure that the interval of desensitization occurs during a definite time period following initiation of multivibrator recovery, the gate circuit is controlled by operation of the multivibrator itself and is so devised that the time delay which it imposes is a precisely accurate time period.

I claim as my invention:

1. Frequency division circuit means comprising, in combination with a source of recurrent timing signals of relatively high frequency to be divided, monostable trigger circuit means having an output and having a control input, said trigger circuit means having a stable condition and an alternate quasi-stable condition of predetermined duration materially longer than the recurrence period of said timing signals, said trigger circuit means being triggerable from its stable condition to its quasi-stable condition by application of a control signal to said control input following substantially full recovery of said circuit means from its quasi-stable condition, gate circuit means operatively connected to said control input to transmit control signals thereto from said source, and means connected between said gate circuit and said trigger circuit means and operable to disable said gate circuit means for a period substantially including the period of recovery of said trigger circuit means from its quasi-stable condition, thereby to prevent application of control signals to said input until after said trigger circuit means has substantially fully recovered, said latter means including control means energizable by the trigger circuit means by and during the quasi-stable condition thereof, and delay means connected to said control element delaying deenergization of said control means upon initiation of recovery of said trigger circuit means from its quasi-stable condition, thereby to permit substantially full recovery of said trigger circuit means before said gate circuit means permits control signals to again reach said input, said delay means imposing a delay interval materially shorter than the duration of said quasi-stable condition.

2. The frequency division circuit means defined in claim 1, wherein the gate circuit means comprises an amplifier having a control element the control means comprising said control element, and the delay means is connected to the control element and comprises an energy storage element energized by the trigger circuit means during the quasi-stable condition thereof, and a drainage circuit connected to said storage element, said delay means comprising a resistance in said drainage circuit prolonging deenergization of said storage element.

3. Frequency division circuit means comprising, in combination, means comprising a source of recurrent timing signals of a frequency to be divided, monostable trigger circuit means having an output and having a control input connected to said source to effect triggering of said trigger circuit means from its stable condition to a quasi-stable condition of predetermined duration in response to a signal from said source, said trigger circuit means having a substantially exponential rate of recovery from its quasi-stable condition, inhibiting means connected to said trigger circuit means and operable thereby during energization of such inhibiting means to prevent such triggering of said trigger circuit means, and energizing means for said inhibiting means including means connecting said trigger circuit means thereto and operable for maintaining said inhibiting means energized for a predetermined period commencing substantially with initiation of recovery of said trigger circuit means.

4. The frequency division circuit means defined in claim 3, wherein the energizing means comprises an energy storage circuit energized from the trigger circuit means through the connecting means during the quasi-stable condition of the trigger circuit means.

5. Frequency division circuit means comprising, in combination, means comprising a source of recurrent timing signals of a frequency to be divided, monostable trigger circuit means having an output and having a control input connected to said source to effect triggering of said trigger circuit means from its stable condition to a quasi-stable condition of predetermined duration in response to a signal from said source, said trigger circuit means having a substantially exponential rate of recovery during its quasi-stable condition, terminated by circuit transients preceding full recovery of its stable condition, and gate means interposed in the connections between said source means and said trigger circuit means, said gate means having a control input having a normal gate-operating voltage and connected to said trigger circuit means for subjecting the latter control input to cut-off voltage by said trigger circuit means during said quasi-stable condition, thereby to prevent passage of timing signals to said trigger circuit means through said gate means during the quasi-stable condition, said gate means control input including means producing, upon termination of said exponential recovery of said trigger circuit means, delayed recovery of the voltage of such control input to the gate-operating voltage thereof but materially more rapidly in proportion than the rate of exponential recovery of said trigger circuit means, whereby substantially complete recovery of said stable condition is permitted before timing signals may again reach the trigger circuit control input.

6. The frequency division circuit means defined in claim 5, wherein the gate means comprises an amplifier having an input connected to the source, having an output connected to the trigger circuit means and having a control element comprising the control input energizable by the trigger circut means to bias said amplifier for preventing passage of the timing signals, said control input further including energy storage means having a slow discharge path delaying deenergization of said control element following initiation of recovery of the trigger circuit means.

7. Frequency division circuit means comprising, in combination, a monostable multivibrator circuit having an output and a control input subject to energization to trigger said multivibrator circuit from its stable condition to its quasi-stable condition, and means for recurringly triggering said multivibrator comprising a source of recurrent triggering signals of a frequency constituting a multiple of the desired triggering frequency, an amplifier having an output connected to said multivibrator control input, a first control element connected to said source to produce amplified triggering signals in said amplifier output, a second control element connected to said multivibrator circuit to be energized thereby substantially to bias off said amplifier selectively during the quasi-stable condition of said multivibrator, and energy storage circuit means connected to said second control element and including an energy storage element charged during the quasi-stable condition of said multivibrator, and means forming a discharge path for said storage element effecting prolonged discharge thereof commencing with initiation of recovery of the multivibrator circuit and lasting throughout substantially the full recovery period thereof to maintain said amplifier effectively biased off substantially until the end of said recovery period.

8. The triggering circuit means defined in claim 7, wherein the energy storage circuit means includes a storage condenser connected to the amplifier second control element for biasing off said amplifier while storage condenser charge exceeds a predetermined value, and wherein the means forming a discharge path for said storage condenser includes a resistance means connected to a point of such relative potential that the rate of discharge of said condenser is substantially linear as the residual charge thereon reaches said predetermined value.

9. The triggering circuit means defined in claim 7, and means in the multivibrator circuit to adjust the length of the quasi-stable period thereof without materially changing the rate of discharge of the energy storage means.

10. Frequency division circuit means comprising, in combination, means comprising a source of recurrent timing signals of a frequency to be divided, monostable trigger circuit means having an output and having a control input connected to said source to effect triggering of said trigger circuit means from its stable condition to a quasi-stable condition of predetermined duration in response to a signal from said source, said trigger circuit means having a substantially exponential rate of recovery during its quasi-stable condition, terminated by circuit transients preceding full recovery of its stable condition, and gate means interposed in the connections between said source means and said trigger circuit means, said gate means having a control input having a normal gate-operating voltage and connected to said trigger circuit means for subjecting the latter control input to cut-off voltage by said trigger circuit means during said quasi-stable condition, thereby to prevent passage of timing signals to said trigger circuit means through said gate means during the quasi-stable condition, said gate means control input including means producing, upon termination of said exponential recovery of said trigger circuit means, delayed recovery of the voltage of such control input to the gate-operating voltage thereof but materially more rapidly in proportion than the rate of exponential recovery of said trigger circuit means, whereby substantially complete recovery of said stable condition is permitted before timing signals may again reach the trigger circuit control input, said gate means comprising an amplifier having an input connected to the source, having an output connected to the trigger circuit means and having a control element comprising the control input energizable by the trigger circuit means to bias said amplifier for preventing passage of the timing signals, said control input further including energy storage means having a slow discharge path delaying de-energization of said control element following initiation of recovery of the trigger circuit means, and means operable to vary the quasi-stable condition period of the monostable trigger circuit means without materially changing the predetermined delay period caused by discharge of the energy storage means.

11. Frequency division circuit means comprising, in combination, means comprising a source of recurrent timing signals of a frequency to be divided, monstable trigger circuit means having an output and having a control input connected to said source to effect triggering of said trigger circuit means from its stable condition to a quasi-stable condition of predetermined duration in response to a signal from said source, said trigger circuit means having a substantially exponential rate of recovery during its quasi-stable condition, terminated by circuit transients preceding full recovery of its stable condition, and gate means interposed in the connections between said source means and said trigger circuit means, said gate means having a control input having a normal gate-operating voltage and connected to said trigger circuit means for subjecting the latter control input to cut-off voltage by said trigger circuit means during said quasi-stable condition, thereby to prevent passage of timing signals to said trigger circuit means through said gate means during the quasi-stable condition, said gate means control input including means producing, upon termination of said exponential recovery of said trigger circuit means, delayed recovery of the voltage of such control input to the gate-operating voltage thereof but materially more rapidly in proportion than the rate of exponential recovery of said trigger circuit means, whereby substantially complete recovery of said stable condition is permitted before timing signals may again reach the trigger circuit control input, and means operable to vary the quasi-stable condition period of the monostable trigger circuit means without materially changing the predetermined period of the inhibiting means during which said inhibiting means remains energized after initiation of recovery of the trigger circuit means.

References Cited in the file of this patent

UNITED STATES PATENTS

| | | |
|---|---|---|
| 2,515,271 | Smith et al. | July 18, 1950 |
| 2,613,318 | Snyder et al. | Oct. 7, 1952 |
| 2,660,668 | Williams | Nov. 24, 1953 |
| 2,762,923 | Quinn | Sept. 11, 1956 |